(12) United States Patent
Khan

(10) Patent No.: US 9,266,290 B2
(45) Date of Patent: Feb. 23, 2016

(54) METHOD OF FORMING AN ARTICLE

(71) Applicant: ROLLS-ROYCE PLC, London (GB)

(72) Inventor: Bijoysri Khan, Derby (GB)

(73) Assignee: ROLLS-ROYCE plc, London (GB)

(*) Notice: Subject to any disclaimer, the term of this patent is extended or adjusted under 35 U.S.C. 154(b) by 181 days.

(21) Appl. No.: 14/222,101

(22) Filed: Mar. 21, 2014

(65) Prior Publication Data
US 2014/0295146 A1 Oct. 2, 2014

(30) Foreign Application Priority Data
Mar. 28, 2013 (GB) .................... 1305695.7

(51) Int. Cl.
B29C 70/38 (2006.01)
B29C 70/54 (2006.01)
B29C 43/20 (2006.01)
B29C 70/06 (2006.01)

(52) U.S. Cl.
CPC ............. B29C 70/386 (2013.01); B29C 43/203 (2013.01); B29C 70/06 (2013.01); B29C 70/541 (2013.01); B29C 70/545 (2013.01); Y10T 428/24628 (2015.01)

(58) Field of Classification Search
CPC ..................... B29C 70/386; B29C 70/388
See application file for complete search history.

(56) References Cited

U.S. PATENT DOCUMENTS

| 3,810,805 | A | * | 5/1974 | Goldsworthy | B29C 70/388 |
| | | | | | 156/271 |
| 3,826,165 | A | * | 7/1974 | Currie | B26F 1/20 |
| | | | | | 83/110 |
| 4,167,130 | A | | 9/1979 | Miller | |
| 4,291,443 | A | * | 9/1981 | Laurie | B21D 31/046 |
| | | | | | 29/6.1 |
| 4,292,108 | A | * | 9/1981 | Weiss | B26D 5/04 |
| | | | | | 156/259 |
| 4,990,207 | A | | 2/1991 | Sakai et al. | |
| 5,011,563 | A | * | 4/1991 | Shinno | B29C 70/388 |
| | | | | | 156/353 |
| 5,562,788 | A | * | 10/1996 | Kitson | B29C 70/384 |
| | | | | | 156/378 |
| 8,394,226 | B1 | | 3/2013 | Booher | |
| 2003/0168444 | A1 | * | 9/2003 | Liakopoulos | B29C 65/18 |
| | | | | | 219/633 |
| 2004/0238107 | A1 | * | 12/2004 | Velleman | B29C 70/506 |
| | | | | | 156/181 |
| 2006/0073311 | A1 | * | 4/2006 | Hogg | B29C 70/386 |
| | | | | | 428/174 |
| 2007/0122590 | A1 | * | 5/2007 | Lalvani | B32B 3/266 |
| | | | | | 428/136 |
| 2011/0140299 | A1 | | 6/2011 | Huang et al. | |

FOREIGN PATENT DOCUMENTS

FR 2 633 213 A1 12/1989
JP A-09-254227 9/1997
WO 2007/135418 A1 11/2007

OTHER PUBLICATIONS

Apr. 29, 2015 Search Report issued in Spanish Application No. 201430429.
Search Report issued in British Application No. 1305695.7 dated Nov. 5, 2013.

* cited by examiner

Primary Examiner — Matthew Daniels
(74) Attorney, Agent, or Firm — Oliff PLC

(57) ABSTRACT

A method is described in which a composite tape or sheet is processed such that it has an improved drapability when applied to a former having a complex geometrical form. The tape or sheet is selectively perforated across its width as it is dispensed, with a suction force being subsequently applied over the tape's surface to thereby cause stretching of the tape. The degree of stretching varies across the width of the tape in proportion to the degree and local density of the selective perforations.

9 Claims, 4 Drawing Sheets

METHOD OF FORMING AN ARTICLE

This invention claims the benefit of UK Patent Application No. 1305695.7, filed on 28 Mar. 2013, which is hereby incorporated herein in its entirety.

FIELD OF THE INVENTION

The present invention relates to a method of forming a composite material and particularly, but not exclusively, to a method of forming a composite material into a shape having a complex geometry.

BACKGROUND OF THE INVENTION

Composite materials in which load bearing fibres are embedded within a polymeric matrix material are commonly used for high performance structural applications.

In such a composite material, the fibres carry the majority of the applied load and therefore a good design aligns the fibres of the composite with the load path through the component. In reality, there are often multiple load paths and therefore the fibres must be oriented in multiple directions. Therefore a fibre lay-up may have a majority of fibre plies oriented in a primary direction, with additional plies oriented at other angles, say 30° or 45°, to the primary direction. If a component experiences a range of different load paths, or if the load paths are unknown, the lay-up of the composite may comprise a number of 0, 90°+45° and −45° angled plies which allow the composite to withstand load paths in any direction.

The fibre lay-up of the composite material may be carried out manually or by an automated process. Manual fibre lay-up is simple and cost effective for smaller part quantities. However it is slow and requires a skilled operator in order to ensure that each fibre ply is correctly placed onto the shaped former or mould.

Alternatively an automated process may be used to construct the fibre lay-up. In such a process, a fibre or tape laying machine can be used to place layers of composite fibre onto the shaped former in different orientations to construct the part.

Automated fibre or tape lay-up can be readily applied, using a range of tape widths, to surfaces having simple curvatures. However for surfaces having more complex curvatures, it becomes necessary to limit the width of the tape laid by the machine in order to ensure correct fibre placement on the shaped former. For highly complex curvatures, it becomes necessary to limit automated lay-up techniques to use with fibre tows in order to be able to steer the fibre over the highly curved surfaces.

While lay-up using a single tow placement machine over a complex former geometry is easier, the fibre lay-up rates are usually very much lower than for tape laying. To overcome this multiple tow placement heads have been developed which makes the machine more complicated and also decreases the amount of control that a user has over the tows during the lay-up process. This in turn can result in defects such as gaps and overlaps being generated during the lay-up process which becomes a significant concern when making high performance parts without incurring a weight penalty.

Due to the limitations of an automated single tow placement machine, the design of the composite component, and specifically the fibre path definitions, becomes more complex and time-consuming. In addition, the complex curvatures of the shaped former makes the repeatability of the tow path placement more difficult because the machine has limited control over the tows between the cutting step and before they are laid down. This necessitates a higher specification, and therefore more costly, machine.

Furthermore, manufacturing induced defects in the composite parts become unavoidable which requires a higher safety factor. This results in an increase in the weight of the part and makes its manufacture more costly.

STATEMENTS OF INVENTION

According to a first aspect of the present invention there is provided a method of forming an article from a composite material, the composite material provided in sheet form and comprising a plurality of tows embedded within a matrix material and arranged widthwise across the sheet, each tow comprising a plurality of filaments, the filaments extending continuously lengthwise along the composite material, the method comprising the steps of;

a. selectively perforating the composite material to sever at least one, but not all, of the filaments of a tow;

b. exerting a force on an upper surface of the composite material in a direction substantially normal to the plane of the composite material thereby extending the partially severed tows and deforming the extended tows out of the plane of the composite material, the degree of perforation being chosen to result in a pre-determined extension;

c. placing a lower surface of the composite material into contact with a three-dimensionally shaped former, such that each of the extended tows conforms to a respective lengthwise surface profile of the former to form a shaped body; and d. curing the shaped body to form the article.

Depending on the surface geometry of the former onto which the composite material is to be laid, the composite material deposition requirement varies. By selectively perforating the composite material over its surface, it is possible for the composite material to be steered and laid over a positive or a negative geometrical feature.

The perforations in the tape material are created only at positions which require increased material compliance and are therefore not present in the remainder of the article. This in turn results in an improved strength of the article when compared to an article produced by individual tow placement.

When the tape comes under the perforating head the profile cutting program cuts or creates a series of split pattern thereby creating localized material strain relieve points.

The method of the present invention provides the ability to use a wide composite tape when forming an article having a complex shape. This makes the article cheaper to produce because on a 'per unit width' basis, a wide tape is considerably cheaper than a narrow fibre tow.

In addition, the lay down rates can be significantly higher than for a fibre tow since the method of the invention allows wider tapes can be laid over complex curvatures.

The composite material may take the form of a tape formed from uni-directional or braided fibres or may be a woven tape.

For a braided tape, the intermittent cutting of the fibres allows greater freedom of lateral movement to change the fibre angle and thereby the width of the material being laid. This minimises the generation of waste material. However, the thickness of the applied braided tape will change and will need to be accommodated for when planning the ply layup.

The method of the invention can be applied to a conventional tape laying machine, by incorporating the features of the perforating head, the shaping hood and the segmented compaction roller assembly either into the machine's feed tray or into the tape laying head itself. It can be used with several types of machines, such as robotic arm, gantry, or drum lay. This makes the method of the present invention cost effective and simple to implement.

Optionally, the force is exerted by applying a suction force across an area of the composite material, the area corresponding to the shaped former.

Optionally, the force is exerted by inducing an electromagnetic field across an area of the composite material, the area corresponding to the shaped former.

The use of a non-contacting method for exerting a stretching force on the fibre tows eliminates the risk of damaging the tows through mechanical contact.

The composite material may itself include ferromagnetic particles which enable the stretching force to be exerted on the fibre tows.

Alternatively, the composite material may be faced with a backing sheet containing ferromagnetic particles or formed from a ferromagnetic material. In this arrangement, the backing sheet is placed on an opposite side of the composite material to the electromagnetic actuator.

Optionally, method step (c) comprises the additional step of:

c1. pressing a segmented roller against the upper surface of the sheet of composite material to bring the composite material into intimate contact with the former; the segmented roller extending widthwise across the sheet, the roller having a plurality of roller segments, each of the roller segments being arranged to conform to a respective lengthwise surface profile of the former.

In order to efficiently consolidate the fibre tows onto the shaped former as they are laid, it is necessary for any roller to be able to conform directly to the surface profile of the shaped former.

By using a segmented roller it becomes possible to consolidate the fibre tows over extremely complex surface curvatures.

Optionally, the arrangement of the roller segments can be altered by hydraulic means.

The use of a hydraulic means of adjusting the roller segment arrangement enables the shape of the roller to be adjusted extremely rapidly which enables the process to be carried out more quickly.

Optionally, the arrangement of the roller segments can be altered by electro-magnetic means.

A feature of electromagnetic actuation is that such an actuator may be overloaded without any resulting damage to the actuator. In contrast the overload of a hydraulic or other electro-mechanical actuator may physically damage the actuator.

Optionally, method step (b) comprises the further steps of:

b2. measuring the deformation of the extended tows out of the plane of the sheet material; and b3. if the measured deformation is less than the pre-determined value, repeating step b.

The deformation of the extended tows is arranged to correspond to the longitudinal section of the surface profile of the shaped former over which the respective tow will be placed. This ensures that each fibre tow corresponds closely to the surface of the shaped former without any significant residual tension in the fibre tow which might cause it to lift off the former's surface.

Optionally, the measurement of the deformation of the extended tows out of the plane of the sheet material is achieved by an electromagnetic means.

By placing an electrically conductive backing sheet to an upper side of the composite material (opposite to the side that is in contact with the former) it is possible to measure changes in an electric field generated across the composite material which result from the deformation of the extended tows out of the plane of the sheet material.

Optionally, the measurement of the deformation of the extended tows out of the plane of the sheet material is achieved by a pneumatic means.

Examples of such measurement techniques may include linear variable displacement transducers (LVDTs), and air gauges in which air flow rate, back pressure and differential pressure provide an indication of the out of plane deformation.

According to a second aspect of the present invention there is provided a moulded article formed using the method of the present invention.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawing in which.

It is noted that the drawings may not be to scale. The drawings are intended to depict only typical aspects of the invention, and therefore should not be considered as limiting the scope of the invention.

DETAILED DESCRIPTION

Figure 1:
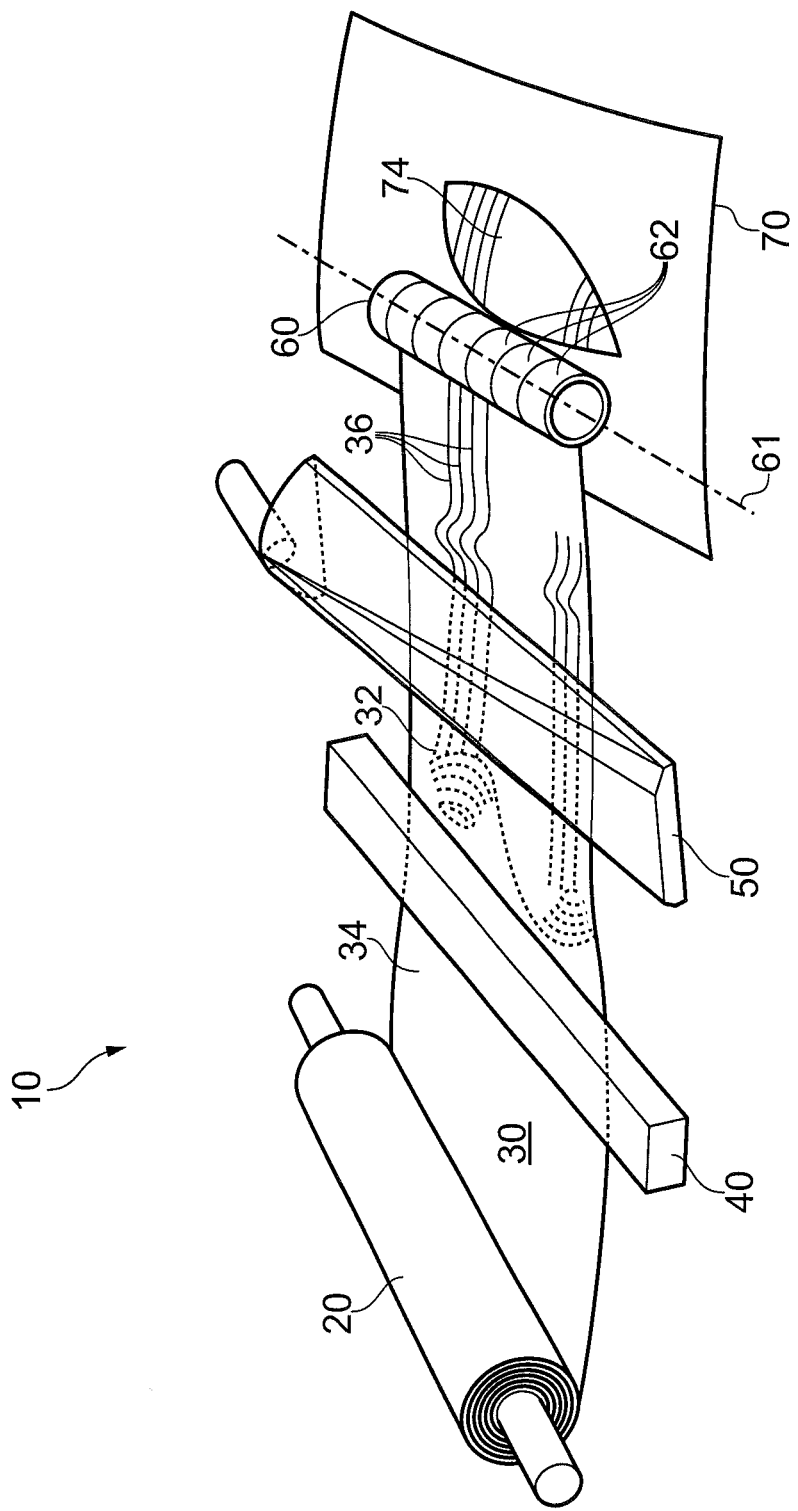
FIG. 1 shows a schematic perspective view of a composite tape laying apparatus implementing the method of the present invention.

Referring to FIG. 1, a forming apparatus according to an embodiment of the invention is designated generally by the reference numeral 10.

The forming apparatus 10 comprises a tape stock roll 20, a perforating head 40, a shaping hood 50 and a roller assembly 60. The tape stock roll 20 holds a wide composite tape 30 which is formed from a plurality of uni-directional fibres held within a resin matrix.

The tape stock roll 20, perforating head 40, shaping hood 50 and roller assembly 60 are arranged in a sequential layout with the composite tape 30 passing from the stock roll 20 and successively beneath each of the perforating head 40, shaping hood 50 and roller assembly 60 in turn.

In the embodiment shown, the forming apparatus 10 is integrally mounted within a conventional automated tow placement head (not shown). In other embodiments the forming apparatus may be separate from the tow placement head.

The perforating head 40 comprises a plurality of bladed cutting portions (not shown) in the form of a dot matrix cutter bank of electro-mechanically driven pins each having a cutting edge. Each cutting edge is configured to mechanically cut some but not all of the fibres within any individual tow. In alternative embodiments, the cutting portions may perforate the tape 30 by ultrasonic, piezo-electric or laser means.

The shaping hood 50 exerts a suction force on an upper surface 34 of the tape 30 as the tape 30 passes thereunder. In the embodiment shown the applied suction force is produced by the action of a partial vacuum within the shaping hood 50 which causes the tape 30 to lift from its dispensed position. The partial vacuum within the shaping hood 50 may be produced by any conventional means, such as a fan or a vacuum pump.

An electromagnetic or a pneumatic actuation system linked to an out of plane displacement measurement system gives feedback control of the applied suction force and hence the shape control of the tape 30. The suction force is also used to collect any trimmed off or waste material from the composite tape 30 in a waste catchment volume (not shown).

In alternative embodiments the suction force may be produced by another means such as electromagnetic means.

The compaction roller assembly 60 has a roller axis 61 and comprises a plurality of roller segments 62 each of which may be moved independently of one another in a direction normal to the plane of the tape 30. This independent relative movement of the individual roller segments 62 is achieved by using a magnetic field to alter the shape of the roller axis 61.

The roller assembly 60 comprises a bank of thin conical shaped rollers mounted over a flexible laminated spindle within which a bank of magnetic field units can be energised to regulate the force applied on individual thin roller segments and to thereby cause the roller assembly 60 to conform to the surface contour of the former 70. The compaction roller is a set of split disc with a conical joint linking the disc. The central core of the disc is connected elastomerically to the flexible laminated spindle. Each disc has an outer rotating sleeve and together the whole assembly is placed in an electroferric or electromagnetic tubing which is internally pressurised allowing the discs to connect while preventing the tape 30 becoming entrapped in the gaps between the discs.

In an alternative embodiment the roller assembly 60 comprises a patterned slit cylinder having an actuator on each of the top and bottom of the spindle axis. This enables the cylinder profile to change shape based on the geometry of the surface of the former 70 and so to apply a compaction force to the tape as it is laid onto the curved geometry.

In an alternative embodiment, the relative movement of the individual roller segments 62 may be achieved by means of hydraulic pressure.

The roller assembly 60 presses the perforated and selectively stretched tape 30 against the surface of a shaped former 70. The shaped former 70 may comprise one or more complex curved portions 74.

This arrangement of the discs or the split pattern on a cylinder allows the roller assembly to act as a rigid roller in the traversing plane while remaining flexible in the compacting plane. This enables the roller assembly to deal with complex, three-dimensional former geometries and to thereby apply a compaction force to the laid composite tape.

Although not shown in the embodiment of FIG. 1, a tape tensioning device (not shown) may be positioned between the shaping head 50 and the roller assembly 60. The tape tensioning device may be used to maintain a level of tension in the stretched portions of the tape 30 and thus to prevent the stretched portions from becoming tangled, folded or otherwise misaligned.

In use, the composite tape 30 is dispensed from the tape roll 20 and passes beneath the perforating head 40. The perforating head 40 produces an array of perforations 32 in the tape 30.

Figure 2A:
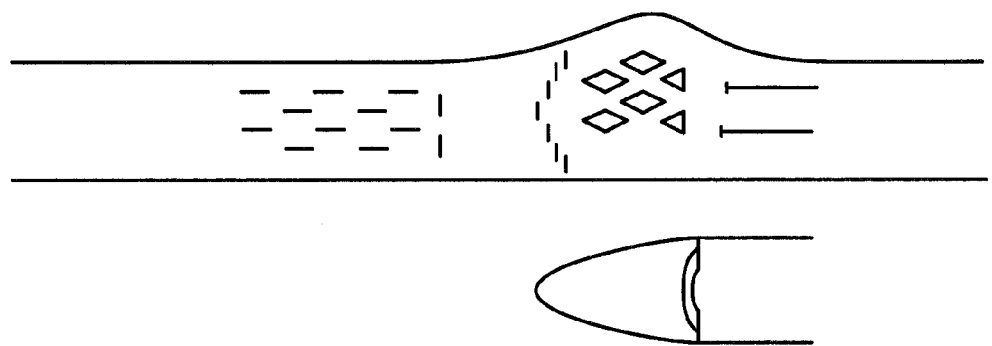
FIGS. 2A, 2B and 2C show examples of the perforation of the composite tape.
Figure 2B:
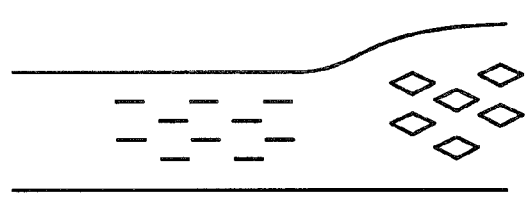
Figure 2C:
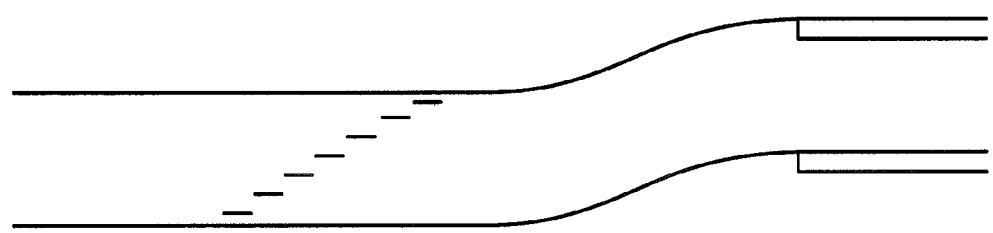

FIGS. 2A, 2B and 2C show examples of the arrangement of perforations 32 in the tape 30.

The position and size of the individual perforations 32 is determined by a profile cutting program based on the CAD geometry and a drape analysis of the composite part being formed. The profile cutting program controls the perforating head 40 and may be included in the control program for the tow placement head.

In its unperforated condition, the tape 30 will not stretch in the longitudinal direction (i.e. along the length of the fibres in the tape 30). However those areas of the tape 30 in which perforations 32 are present will exhibit a certain degree of longitudinal stretching. The degree of longitudinal stretching is directly proportional to the degree of perforation of the area of the tape 30. In other words, a higher density of perforations 32 will cause a greater degree of longitudinal stretching of the tape 30.

By arranging a number of perforations 32 longitudinally close together and along the length of the fibres in the tape 30, the wide tape 30 is caused to separate into narrower tape sections 36. The width of these narrower tape sections 36 is defined by the distance between the longitudinal rows of perforations 32.

Figure 3:
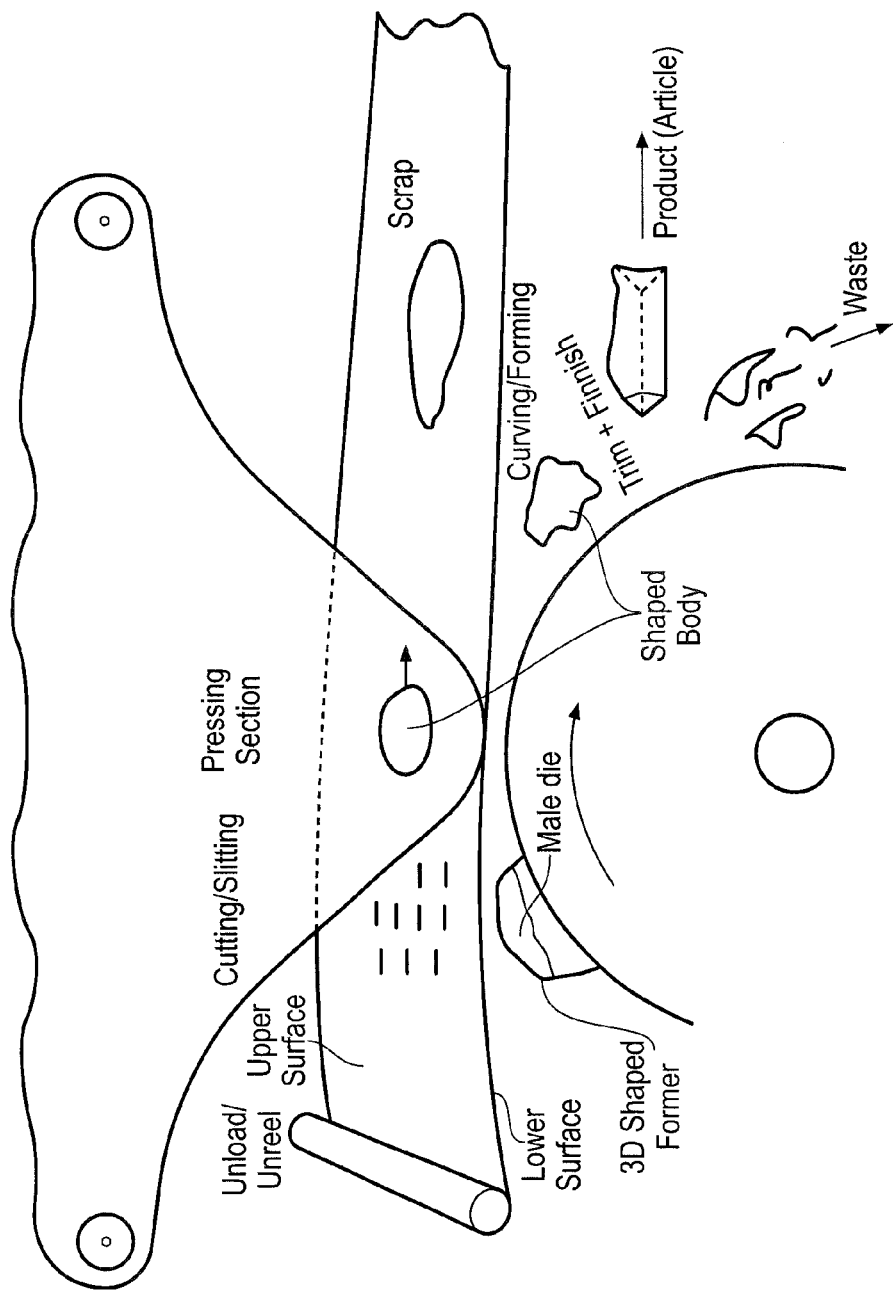
FIG. 3 shows a schematic diagram of the process of the method of the invention.

This process is illustrated schematically in FIG. 3 which shows an example embodiment of the method of the invention.

The narrower tape sections 36 have increased longitudinal stretchability and therefore exhibit an increased degree of longitudinal stretching when the perforated tape is subjected to a suction force by the shaping hood 50.

Increasing the number of longitudinal rows of perforations 30 in the tape 30 enables the tape 30 to be divided into a larger number of narrower tape sections 36. By varying the width of these tape sections 36 it is possible to vary the degree of stretching exhibited by the tape sections 36.

Figure 4:
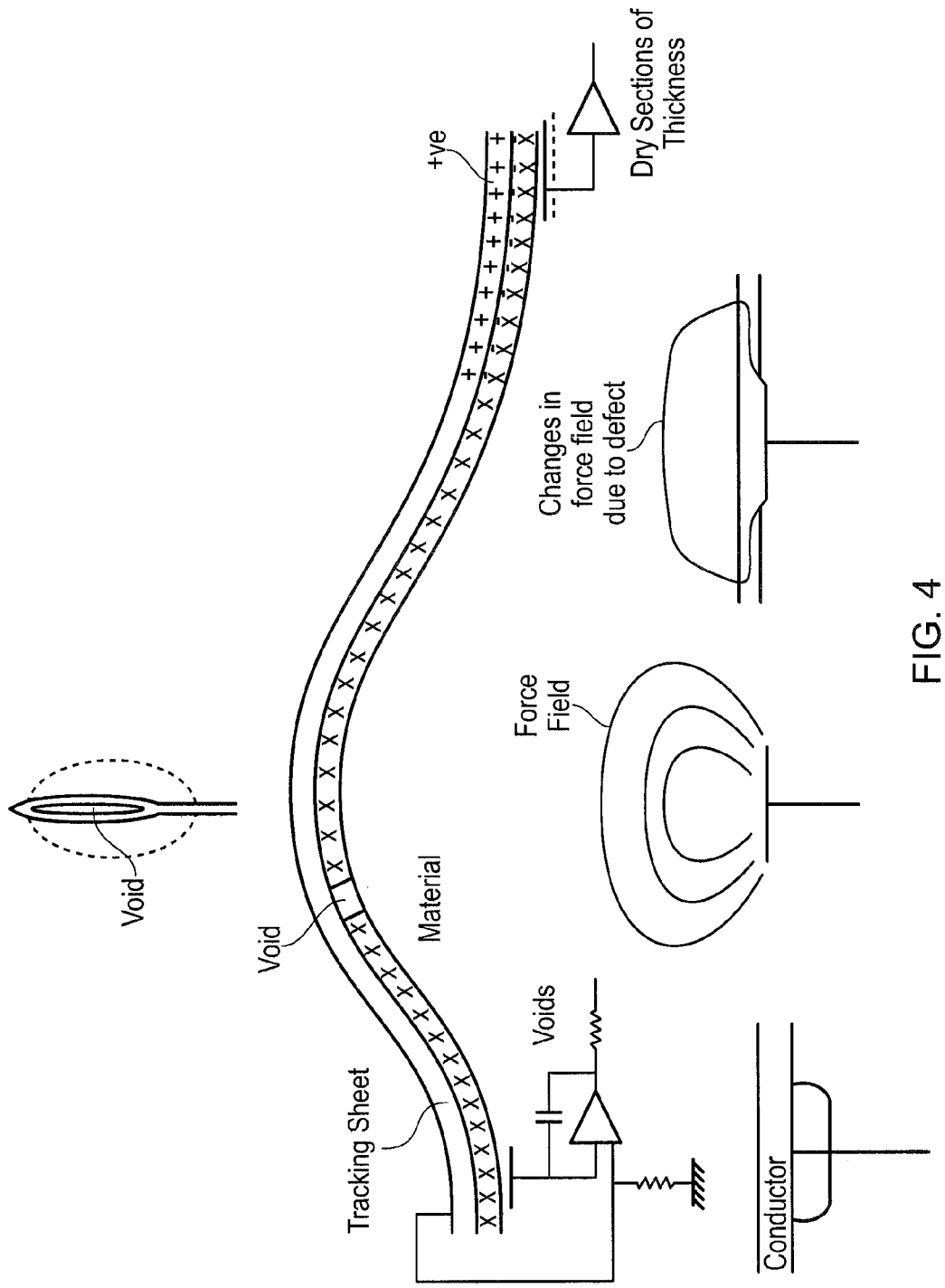
FIG. 4 shows a schematic arrangement of the apparatus of FIG. 1 illustrating the measurement of the extended composite tape.

FIG. 4 shows a schematic arrangement of the embodiment of the method of the invention including a system for measuring the deformation of the tape 30.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A method of forming an article from a composite material, the composite material provided in sheet form and comprising a plurality of tows embedded within a matrix material and arranged widthwise across the sheet, each of a plurality of tows comprising a plurality of filaments, the filaments extending continuously lengthwise along the composite material, the method comprising steps of:
   a. selectively perforating the composite material to split, slit or sever at least one, but not all, of the filaments of each of one or more of the plurality of tows;
   b. exerting a force on an upper surface of the composite material in a direction substantially normal to a plane of the composite material thereby extending each of the one or more partially split, slit, or severed tows, and deforming the one or more extended tows out of the plane of the composite material, a degree of perforation being chosen to result in a pre-determined extension, the force being exerted by applying a suction force across an area of the composite material, the area corresponding to a three-dimensionally shaped former;
   c. placing a surface of the composite material into contact with the three-dimensionally shaped former, such that each of the extended tows conforms to a respective lengthwise surface profile of the former to form a shaped body; and d. curing the shaped body to form the article.

2. The method as claimed in claim 1, wherein step (c) comprises the additional step of:

c1. pressing a pressure element against the upper surface of the sheet of composite material to bring the composite material into intimate contact with the former; the pressure element extending widthwise across the sheet, the pressure element having a plurality of segments, each of the segments being arranged to conform to a respective lengthwise surface profile of the former.

3. The method as claimed in claim 2 wherein the pressure element is selected from the group comprising cylindrical rollers, tapered rollers, segmented rollers and belts.

4. The method as claimed in claim 3, wherein the arrangement of the roller segments can be altered by hydraulic actuator.

5. The method as claimed in claim 3, wherein the arrangement of the roller segments can be altered by electro-magnetic actuator.

6. The method as claimed in claim 1, wherein step (b) comprises the further steps of:

b2. measuring the deformation of the extended tows out of the plane of the sheet material; and b3. if the measured deformation is less than the pre-determined value, repeating step b.

7. The method as claimed in claim 6, wherein the measurement of the deformation of the extended tows out of the plane of the sheet material is achieved by an electromagnetic actuator.

8. The method as claimed in claim 6, wherein the measurement of the deformation of the extended tows out of the plane of the sheet material is achieved by a pneumatic actuator.

9. The method of forming an article from a composite material, the composite material provided in sheet form and comprising a plurality of tows embedded within a matrix material and arranged widthwise across the sheet, each of a plurality of tows comprising a plurality of filaments, the filaments extending continuously lengthwise along the composite material, the method comprising steps of;

a. selectively perforating the composite material to split, slit or sever at least one, but not all, of the filaments of each of one or more of the plurality of tows;

b. exerting a force on an upper surface of the composite material in a direction substantially normal to a plane of the composite material thereby extending each of the one or more partially split, slit, or severed tows, and deforming the one or more extended tows out of the plane of the composite material, a degree of perforation being chosen to result in a pre-determined extension, the force being exerted by, using ferromagnetic materials to induce an electromagnetic field across an area of the composite material, the area corresponding to a three-dimensionally shaped former;

c. placing a surface of the composite material into contact with the three-dimensionally shaped former, such that each of the extended tows conforms to a respective lengthwise surface profile of the former to form a shaped body; and d. curing the shaped body to form the article.

\* \* \* \* \*